United States Patent
Ikenoue

(10) Patent No.: US 8,509,484 B2
(45) Date of Patent: Aug. 13, 2013

(54) INFORMATION PROCESSING DEVICE AND INFORMATION PROCESSING METHOD

(75) Inventor: Shoichi Ikenoue, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 131 days.

(21) Appl. No.: 13/147,859

(22) PCT Filed: Oct. 23, 2009

(86) PCT No.: PCT/JP2009/005583
§ 371 (c)(1),
(2), (4) Date: Sep. 12, 2011

(87) PCT Pub. No.: WO2010/095190
PCT Pub. Date: Aug. 26, 2010

(65) Prior Publication Data
US 2011/0317874 A1  Dec. 29, 2011

(30) Foreign Application Priority Data
Feb. 19, 2009  (JP) .................................. 2009-037206

(51) Int. Cl.
*G06K 9/00* (2006.01)
*H04N 5/225* (2006.01)

(52) U.S. Cl.
USPC ........................................ 382/103; 348/169

(58) Field of Classification Search
USPC ............... 382/103, 107, 236; 348/152, 154, 348/155, 169, 170, 171, 172, 208.14, 208.16, 348/352, 353, 356, 465, 558; 712/56, 231, 712/300; 715/250, 862
See application file for complete search history.

(56) References Cited

U.S. PATENT DOCUMENTS

| | | | |
|---|---|---|---|
| 7,308,112 B2 * | 12/2007 | Fujimura et al. | 382/103 |
| 7,940,957 B2 * | 5/2011 | Ikenoue et al. | 382/103 |
| 2008/0063236 A1 | 3/2008 | Ikegami | |

FOREIGN PATENT DOCUMENTS

| | | |
|---|---|---|
| JP | 2007328746 A | 12/2007 |
| JP | 2008015942 A | 1/2008 |
| JP | 2008112360 A | 5/2008 |

OTHER PUBLICATIONS

International Search Report for corresponding application PCT/JP2009/005583, dated Dec. 28, 2009.
International Preliminary Report on Patentability and Written Opinion for corresponding application PCT/JP2009/005583, dated Sep. 13, 2011.
Office Action issued for corresponding Japanese Patent Application No. 2009-037206, dated Apr. 9, 2013.

* cited by examiner

*Primary Examiner* — Abolfazl Tabatabai
(74) *Attorney, Agent, or Firm* — Matthew B. Dernier, Esq.; Gibson & Dernier LLP

(57) ABSTRACT

An image acquisition unit of an information processing device acquires data for a moving image including an image of a user and captured by an image capturing device. A tracking processing unit uses a particle filter to perform visual tracking in the moving image so as to estimate a head contour of the user. A gesture detection unit identifies a facial region in an area inside the head contour, acquires a parameter indicating the orientation of the face, and keeping a history of parameters. When time-dependent change in the orientation of the face meets a predetermined criterion, it is determined that a gesture is made. The output data generation unit generates output data dependent on a result of detecting a gesture. The output control unit controls the generated output data so as to display the data on the display, for example.

14 Claims, 7 Drawing Sheets

INFORMATION PROCESSING DEVICE AND INFORMATION PROCESSING METHOD

TECHNICAL FIELD

The present invention relates to information processing technology and, more particularly, to an information processing device that includes a user interface for performing processes responsive to user inputs and to an information processing method executed in the device.

BACKGROUND ART

Electronic devices and information processing devices including game devices and home appliances that are available in recent years provide significantly advanced functions. In association with this, the system that allows a user to provide an input through a user interface has become increasingly complicated. Various improvements have been made to user interface so that a use can provide an input easily using such a complicated input system. For example, attempts have been made to use different approaches to assignment of functions to controller buttons or to use a touch panel. Also proposed are technologies of performing processes adapted to change in the orientation of the user's face by analyzing an image acquired by using a device designed to capture an image of the user as an interface (see, for example, patent document No. 1).

By using an image capturing device as a user interface, face recognition technology can generally be used to detect, for example, the state of the user's face. For example, facial portions may be detected by computing a matching score between a reference image prepared in advance and an image of the detected facial region or by extracting characteristic points, so that temporal change in the state of the user's face may be acquired.

[patent document No. 1] JP 2008-112360

Problem to be Solved by the Invention

In association with the advancement in information processing technology and diversification in environments in which electronic devices or information processing devices are used, in users, and in processing details, different user interfaces are required depending on the factor that causes the difference. Therefore, the mode of user interface should be more diversified to capture such needs. In particular, there is called for a user interface that allows a user to provide an input through a more natural movement without experiencing a complex process of, for example, providing an input using a large number of buttons.

The present invention addresses the aforementioned issue and a purpose thereof is to provide an information processing technology that includes a user interface capable of providing accurate ways of providing an input through a gesture of a person's head.

One embodiment of the present invention relates to an information processing device. The information processing device comprises: an image capturing device configured to capture a movement of an object within a moving image; a tracking processing unit configured to define a candidate curve representing a contour of an object in a current image frame included within the moving image captured by the image capturing device, based on a contour of the object estimated in an image frame at a preceding point of time, and to estimate the contour of the object in the current image frame by observing the likelihood of the candidate curve; a gesture detection unit configured to acquire a parameter indicating an orientation of the object or a position of the object by performing image analysis in an area inside the contour of the object estimated by the tracking processing unit, and determine whether a gesture is made by checking a time-dependent change in the orientation of the object or in the position of the object estimated by referring to the parameter against a criterion defined for each gesture; and an output data generation unit configured to perform, when the gesture detection unit determines that a gesture is made, a process corresponding to the gesture and generate output data accordingly.

Another embodiment of the present invention relates to an information processing method. The information processing method comprises: capturing a movement of an object within a moving image; defining a candidate curve representing a contour of an object in a current image frame included within the moving image as captured, based on a contour of the object estimated in an image frame at a preceding point of time, and estimating the contour of the object in the current image frame by observing the likelihood of the candidate curve; acquiring a parameter indicating an orientation of the object or a position of the object by performing image analysis in an area inside the contour of the object as estimated; determining whether a gesture is made by checking a time-dependent change in the orientation of the object or in the position of the object estimated by referring to the parameter, against a criterion defined for each gesture; and performing, when it is determined that a gesture is made, a process corresponding to the gesture and generating output data accordingly.

Optional combinations of the aforementioned constituting elements, and implementations of the invention in the form of methods, apparatuses, systems, computer programs, and recording mediums having embodied thereon a computer program may also be practiced as additional modes of the present invention.

Advantage of the Present Invention

According to the present invention, a gesture of a person's head can be used to perform a variety of processes with high precision.

BEST MODE FOR CARRYING OUT THE INVENTION

Figure 1:
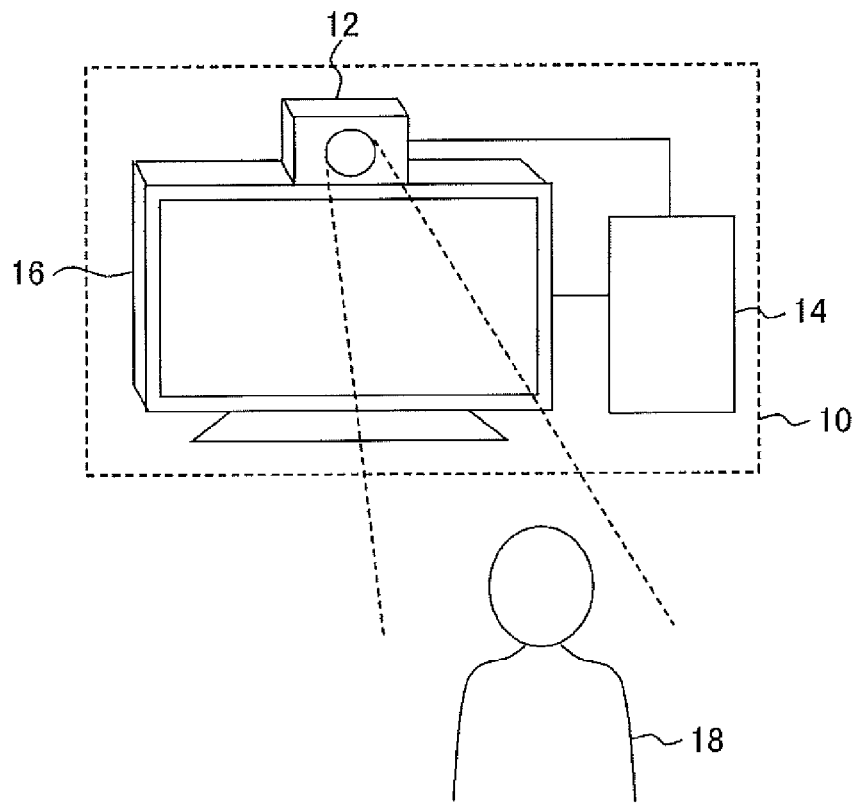
FIG. 1 shows the configuration of an information processing system to which the embodiment is applicable.

FIG. 1 shows the configuration of an information processing system to which the embodiment is applicable. An information processing system 10 comprises an image capturing device 12 configured to capture an image of a user 18, an information processing device 14 configured to detect the user's gesture and perform image processing accordingly, and a display 16 configured to output image data obtained as a result of processing by the information processing device.

Connection from the information processing device 14 to the image capturing device 12 or to the display 16 may be wired or wireless or they may be connected through specific networks. Alternatively, any two of or all of the image capturing device 12, information processing device 14, and display 16 may be integrally provided. The image capturing device 12 may not necessarily be mounted on the display 16. In the following description, the image capturing device 12 is assumed to capture an image of the user 18 facing the display 16 from front. However, a similar process can be performed using simple coordinate conversion, even if the direction of imaging differs. The user 18 may more than one depending on the content of processing performed by the information processing device 14.

The image capturing device 12 captures data of an image that includes the user 18 at a predetermined frame rate. The moving image data acquired is input into the information processing device 14. The information processing device 14 detects time-dependent variation in the orientation of the face or in the orientation of the head from the moving image data acquired from the image capturing device 12. In this embodiment, a gesture of the head is detected by acquiring time-dependent change in the orientation of the face of the user 18 and the result of detection is used in various processes. For accurate detection of a gesture of the head, the head contour is subject to visual tracking. The specific method will be discussed later. Processes that could be performed by the information processing device 14 using a detected gesture are non-limiting. The following description of the embodiment primarily concerns a mode whereby a gesture of swinging the head is detected. Gestures using body parts such as palm or foot, gestures using the entirety of the body, or gestures using an object held by the user may similarly be detected.

Figure 2:
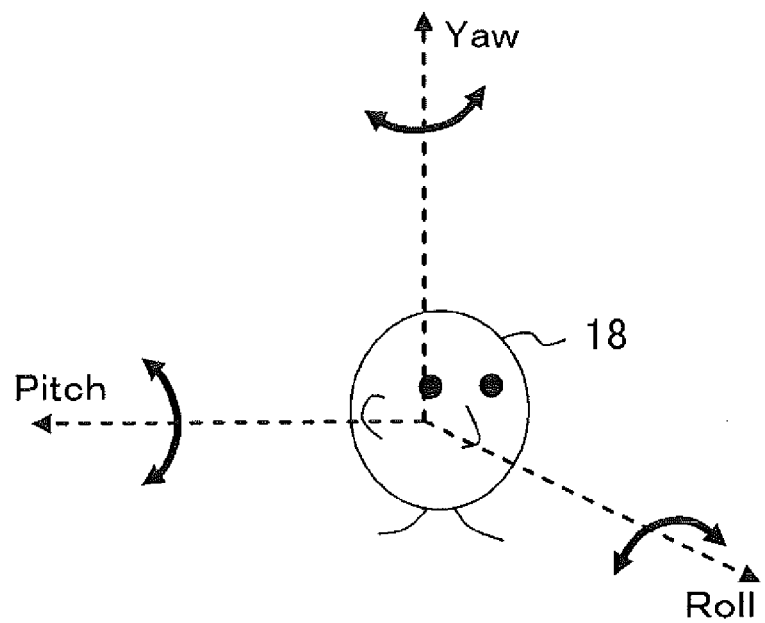
FIG. 2 shows orientations of rotation of the head as a person makes a gesture using the head.

FIG. 2 shows orientations of rotation of the head as a person makes a gesture using the head. When the user 18 shakes the head sideways, it is considered to be rotation around the Yaw axis. Similarly, nodding is considered to be rotation around the Pitch axis, and the tilting is considered to be rotation around the Roll axis. In this embodiment, rotation around at least one of the rotation axes is detected by acquiring the orientation of the face in image frame occurring at respective points of time. By interpreting variation in the angle of rotation around the Pitch axis (nodding) as a gesture expressing affirmation, variation in the angle of rotation around the Yaw axis (shaking of head) as a gesture expressing negation, and variation in the angle of rotation around the Roll axis (tilting of the head) as a gesture expressing uncertainty, games can be played and information processing can be performed that reflect the expressed will.

Alternatively, variation of three types may merely be used as an input for selection from a maximum of three options. In this case, by mapping the orientation of swinging the head to a process, the information processing device 14 can use variation in the orientation of the face in place of an ordinary input device such as a mouse, a tracking ball, an analog stick, etc., enabling the device 14 to perform a wider variety of processes. In the following description, the meaning of the term "gesture" is extended to cover the swinging of the head mapped to information processing in a predefined manner as well as covering gestures ordinarily used. Examples of processes executed by the information processing device 14 will be discussed later. The display 16 acquires image data generated by reflecting the result of detection of a gesture of the user 18 by the information processing device 14 and outputs the data as an image.

A description will now be given of the principle of detecting time-dependent change in the orientation of the face of the user 18 by the information processing device 14. In this embodiment, the movement of the head contour is tracked in order to detect time-dependent change in the face orientation with precision. More specifically, a visual tracking process using a particle filter is performed in an image captured by the image capturing device 12 and including the user 18. Visual tracking of the head contour is a technology of estimating the time evolution of the head contour captured in image frames in the moving image. It is unlikely that the head contour varies significantly between image frames even if the orientation of the face changes. As a result, time-dependent change in the face orientation hardly affects the precision with which a gesture is detected.

As mentioned above, "time-dependent change in the face orientation" (action taking place over a period of time) is used as an input in this embodiment. Face recognition technology generally used for image processing of a facial region is basically a process for still images. Using face recognition technology to detect time-dependent change means concatenating results of detection in a plurality of still images. Basically, the process of such a face recognition itself does not take into account the relevance to preceding image frames other than for the purpose of making the process more efficient. Therefore, an error is likely to be produced in detecting an event that takes place in a finite period of time and that may involve a change in the imaged scene due to a plurality of persons captured in the image or the movement of a person. Since the embodiment tracks time-evolution of the head contour, the movement of individual persons can be captured with precision by referring to the relevance to preceding image frames.

Figure 3:
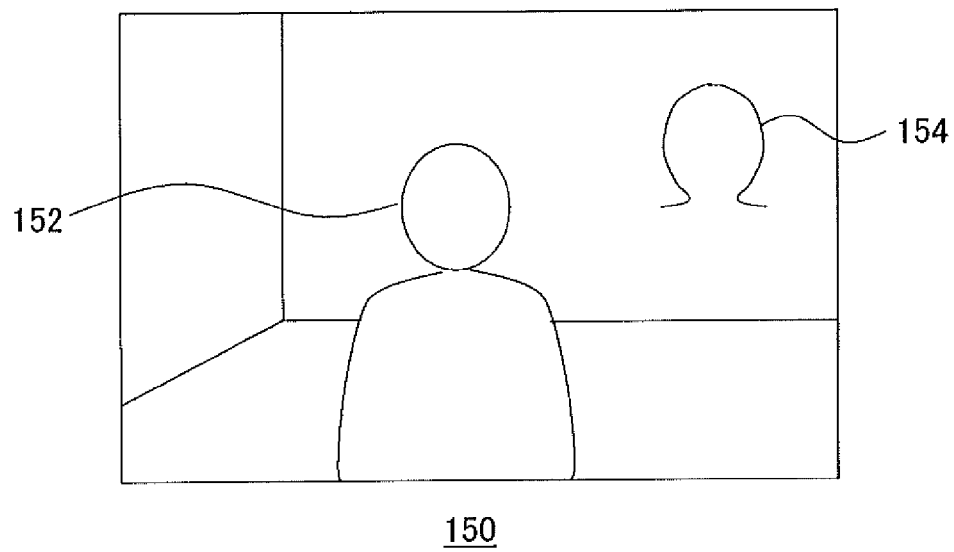
FIG. 3 illustrates a visual tracking method where a person is the target object.

FIG. 3 illustrates a visual tracking method where a person is the target object. An image 150 of a person is one of the image frames forming a moving image stream and shows a person 152 being the target object. The person 152 corresponds to the user 18 of FIG. 1

In order to track the motion of the person 152, the head and shoulder contours of the person 152 (hereinafter, simply referred to as the head contour) is approximated by a Greek ohm-shaped curve 154 where the Greek ohm-shaped curve 154 is described by a known representation. The image 150 of the person, which shows the person 152, is subjected to an edge extracting process, and an edge image is thereby obtained. The curve 154 is then translated, expanded, contracted, or rotated by changing the parameters defining the curve 154, and edge near the curve 154 is detected so as to obtain the parameters that best match the head contour of the person 152. The above process is repeated for each frame, so that tracking of the person 152 proceeds. In this instance, the edge usually refers to a position at which density or color changes drastically in an image.

The matching score computation of the curves 154 defined by various parameter values and the head contour of the person 152 is implemented by a probability distribution prediction technique using a particle filter. Specifically, the number of the target candidates is reduced by increasing or decreasing the sampling number of the curve 154 according to a probability distribution of the object in the parameter space of the previous image frame. As a result, it becomes possible to focus the search on areas where the existence probability is high, allowing for accurate, efficient matching score computation.

Applications of the particle filter to tracking that focuses on object contours are described in detail in, for example, the non-patent document (ICondensation: Unifying low-level and high-level tracking in a stochastic framework, Michael Isard and Andrew Blake, Proc 5th European Conf. Computer Vision, 1998). The process required to apply such a tracking technique to the present invention is described below.

The Greek ohm-shaped curve 154 is first described by a B-spline curve. The B-spline curve is represented by n control points (Q0, ... Qn) and n knots (s0, ... sn). These parameters are preset to describe a fundamental curve shape, in this instance being a Greek ohm shape. The fundamental curve described by the preset parameters is hereinafter referred to as the template Qt. The shape described by the template Qt depends on a target object and in the present instance is a Greek ohm shape when the person 152 in the person image 150 shown in FIG. 2 is the target object. For example, when the target object is a ball, the curve to be described has a circular shape; when the target object is a palm, the curve has a palm shape.

Next, a shape-space vector x is given as the transformation parameters for changing the state of the template. The shape-space vector x is represented by six parameters as follows:

$$x=(shift_x, shift_y, extent_x \cos\theta - 1, extend_y \cos\theta - 1, -extend_x \sin\theta, extend_y \sin\theta)^T \quad (1)$$

where $(shift_x, shift_y)$ is a translation amount in (x, y) direction, $(extend_x, extend_y)$ is a magnification, and $\theta$ is a rotation angle. Using the operational matrix W for operating the shape-space vector x on the template Qt, the curve after transformation, i.e., the candidate curve Q, is represented as follows:

$$Q = Wx + Q_t, \quad (2)$$
$$W = \begin{pmatrix} 1 & 0 & Q_t^x & 0 & 0 & Q_t^y \\ 0 & 1 & 0 & Q_t^y & Q_t^x & 0 \end{pmatrix}$$

Expression 2 with the six parameters of the shape-space vector x changed accordingly makes it possible to translate, rotate, expand, and contract the template and combinations of these operations allow the candidate curve Q to change accordingly.

Next, the edges of the person 152 close to the respective knots of multiple candidate curves are detected. The multiple candidate curves are described by the various parameters of the template Qt, such as intervals of the control points and knots, and various sets of the six parameters of the shape-space vector x. Likelihoods of the candidate curves are then calculated from, for example, the distances between the edges and the knots. The probability density distribution in the six-dimensional space defined by the six parameters of the shape-space vector x is estimated based on these likelihoods.

Figure 4:
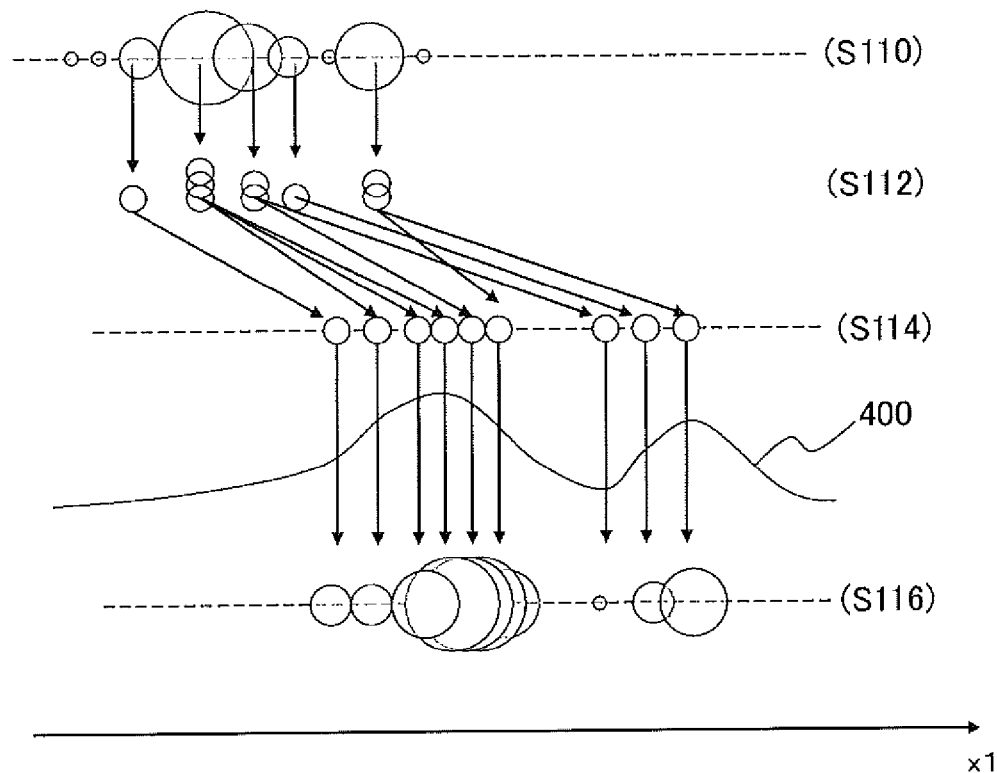
FIG. 4 illustrates a probability density distribution estimation method using a particle filter.

FIG. 4 illustrates a probability density distribution estimation method using a particle filter. In FIG. 2, the horizontal axis shows parameter x1, which is one of the six parameters of the shape-space vector x, to aid understanding of the present invention. However, it should be appreciated that the other parameters are actually processed in the same manner as the parameter x1 in the six-dimensional space. In this instance, consider the example where the image frame whose probability density distribution is to be estimated is at time t.

A probability density distribution in the axis for the parameter x1 is given (S110). This probability density distribution is estimated in the image frame at time t−1, which is one frame previous to the image frame at time t. Particles at time t are then created using the estimated probability density distribution (S112). If there are already particles obtained by filtering, it is determined at this point whether the particles are divided or eliminated. The probability density distribution shown at step S110 is discretely calculated in accordance with the coordinates in the parameter space, and it shows that the larger the circle, the higher the probability density.

The particles are a representation of the sample values of the parameter x1 and the sampling densities. For example, a high probability density region of parameter x1 at time t−1 is described by particles with a high density, so that sampling is focused thereon; a low probability density region is described by particles with a low density, so that the sampling number is small. This allows for efficient matching score computation by creating a large number of the candidate curves near the edge of the person 152, for example.

The particles are then caused to make a transition in the parameter space using a given motion model (S114). The motion model is, for example, a Gaussian motion model, or an autoregression motion model. The Gaussian motion model defines that a probability density at time t around each probability density at time t−1 shows a Gaussian distribution. The autoregression motion model is a technique that assumes an autoregression prediction model for sample data in more than two dimensions; for example, it assumes from changes in the previous parameters that the person 152 moves at a constant speed. With reference to FIG. 2, it is assumed by the autoregression motion model that the parameter x1 moves in the positive direction and the particles are transited accordingly.

The edges of the person 152 close to the candidate curve specified by each particle is searched for using the edge image obtained at time t, the likelihoods of the candidate curves are calculated using the search result, and the probability density distribution at time t is estimated based on these likelihoods (S116). As described above, the estimated probability density distribution discretely shows a true probability density distribution 400, as shown in S116. The probability density distribution at each time is described in the parameter space by repeating the above detailed process. For example, when a probability density distribution is unimodal, in other words, if there is only one target object, a curve estimated to be the contour of the target object is obtained by finally setting, as each parameter, a sum of the parameter values which are weighted with the probability densities.

The probability density distribution $p(x_t^i)$ at time t estimated in S116 is calculated as follows:

$$p(\hat{x}_t^i) = \eta p(y_t|\hat{x}_t^i) \int p(\hat{x}_t^i|\hat{x}_t^i, u_{t-1}) p(\hat{x}_t^i) d\hat{x}_{t-1}^i \quad (3)$$

where i is a unique particle number, $p(x_t^i|x_t^i, u_{t-1})$ is a given motion model, and $p(y_t|x_t^i)$ is a likelihood. The probability density distribution given by the expression 3 is given for each parameter of a shape-space vector. Therefore, the shape-space vector at each point of time can be estimated by calculating the weighted average of the particles using the probability density distribution.

The area inside the Greek ohm-shaped head contour and defined by the shape-space vector at each point of time obtained thus substantially comprises a facial region and a hair region. In this regard, changes in the face orientation are detected by acquiring changes in the facial region of the head contour. For example, a facial region in the head region in each image frame is identified by texture mapping so that variation in the occupied area and variation in the direction are acquired. To identify a facial region, any of the characteristics of an image including color, edge, frequency distribution, etc. other than texture may be used. In this case, if the occupied area oscillates, it is determined that the face orientation oscillates and, ultimately, that the user 8 is shaking the head. If the region extends or contracts in the vertical direction, it means a change in the Pitch angle. If the extension or contraction occurs in the horizontal direction, it means a change in the Yaw angle.

By integrating these types of variation, gestures of "affirmation" and "negation" can be detected. Variation in the Roll angle can be detected by referring to change in the rotation angle θ (one of the parameters of the shape-space vector used in the aforementioned visual tracking process). This allows detection of a gesture of "doubt" indicated by the tilting of the head. Thus, the embodiment ensures accurate detection of a gesture of the head and can be used in combination with a variety of applications using the detection.

Figure 5:
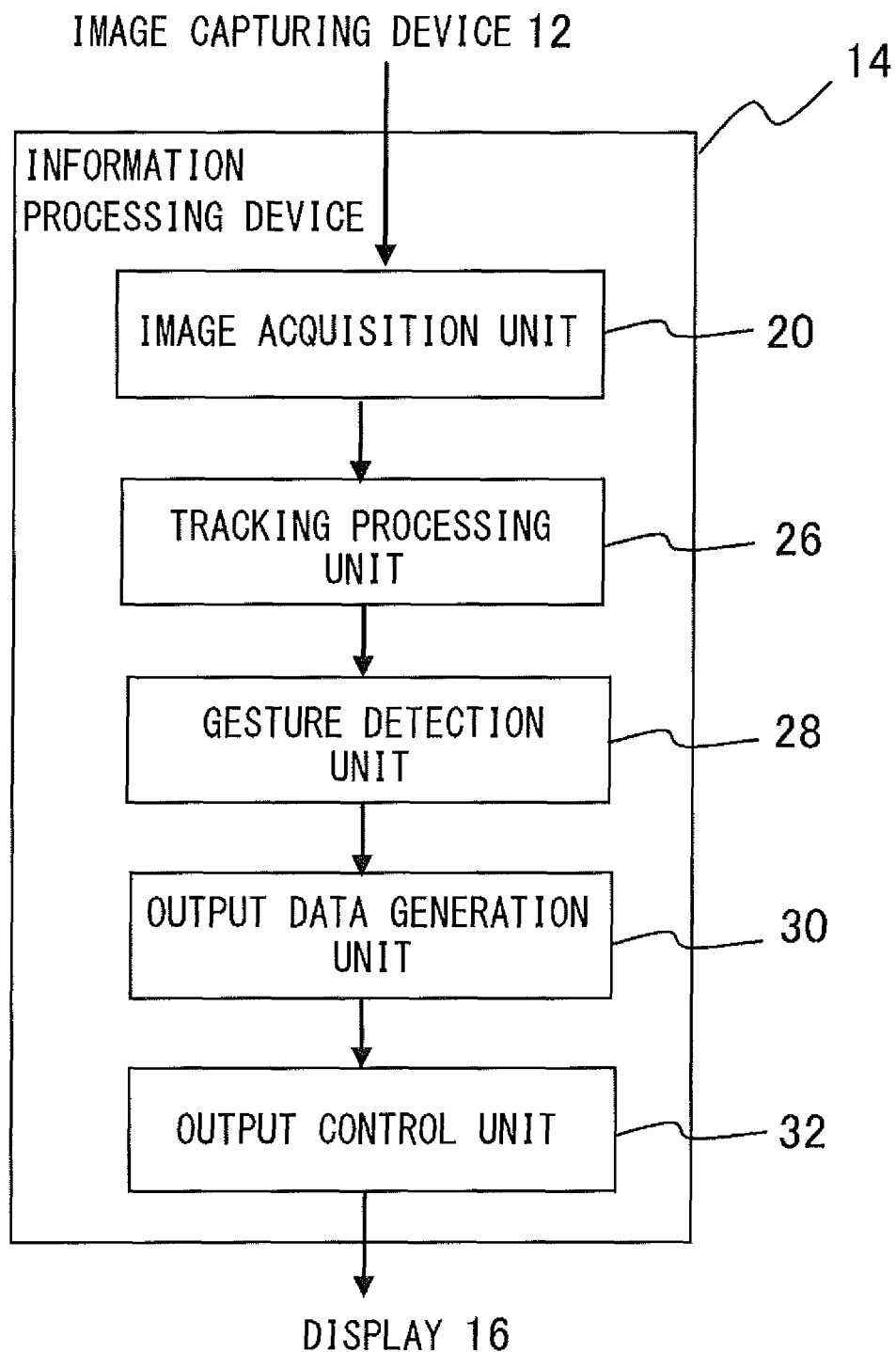
FIG. 5 shows the configuration of the information processing device according to the embodiment in detail.

FIG. 5 shows the configuration of the information processing device 14 in detail. The information processing device 14 comprises an image acquisition unit 20 configured to acquire image data input from the image capturing device 12, a tracking processing unit 26 configured to perform the aforementioned visual tracking process, a gesture detection unit 28 configured to detect a gesture from image data for the area inside a head contour obtained as a result of tracking, an output data generation unit 30 configured to run an application like a game using detected gestures and generate output data such as image data, and an output control unit 32 configured to control the output of the generated output data to the display 16.

Figure 6:
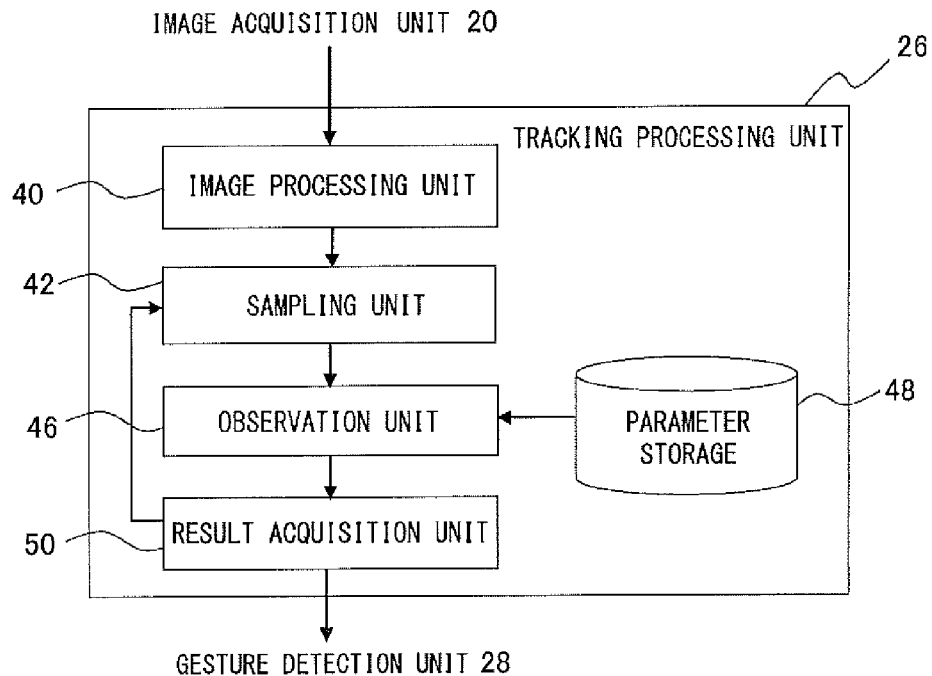
FIG. 6 shows the configuration of the tracking processing unit according to the embodiment in detail.
Figure 7:
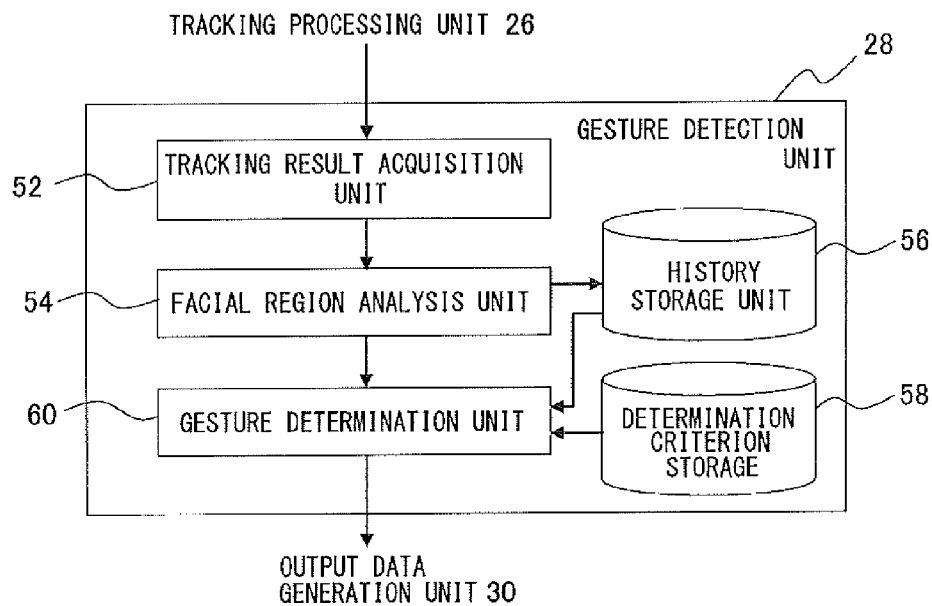
FIG. 7 shows the configuration of the gesture detection unit according to the embodiment in detail.

In FIGS. 5, 6, and 7, the components described as functional blocks which perform various processes are provided by hardware such as CPU, memory, and other LSI, or by software such as image processing programs and the like. Therefore, it will be obvious to those skilled in the art that the functional blocks may be implemented in a variety of manners by a combination of hardware and software.

The image acquisition unit 20 acquires an image of the user from the image capturing device 12 in realtime by cable or wirelessly. The tracking processing unit 26 tracks head contour of the user using the above-mentioned visual tracking method. The gesture detection unit 28 detects a gesture as described above by referring to the data for the head contour obtained as a result of tracking by the tracking processing unit 26 and captured in image frames occurring at respective point of times. In the above description, it is assumed that a facial region in the head region at each point of time is identified by texture mapping, and time-dependent change in the orientation around the Pitch axis and around the Yaw axis is acquired by using time-dependent change in the area occupied by the facial region and the direction of change. Meanwhile, methods other than texture mapping may be used.

For example, a face recognition process may be performed in the head region. In this case, time-dependent change in the Pitch angle and the Yaw angle may be acquired by recording the result of detection such as the relative positions of different facial portions or the positions of a specific portion at respective point of times. Alternatively, the direction of movement of the area inside a head contour and the amount of the movement may be globally analyzed using a technology such as optical flow or the Lucas-Kanade algorithm (klt) generally used in the field of computer vision.

Alternatively, a matching score may be computed between the area inside a head contour at each point of time and the area inside a head contour in an image frame preceding in time (e.g., the immediately preceding image frame). Variation in the orientation of the head region may be acquired from the amount/direction of movement of a portion of interest in the inside area and the amount/direction of variation in the area occupied by a portion of interest in the inside area. In image analysis such as matching or optical flow, rotation of the head itself can be detected. It is therefore possible to detect a gesture even if the facial region is small as in the case where the face is imaged from the proximity of the back of the user. In any case, parameters indicating the orientation of the face or the orientation of the head are acquired in each image frame and time-dependent change in the parameters is recorded. A gesture is determined to be made when the time-dependent change meets a criterion defined for the gesture.

When the gesture detection unit 28 determines that a gesture is made, the output data generation unit 30 performs a process corresponding to the result and generates output data such as image data. As mentioned above, the embodiment is applied to various applications. Therefore, the output data generation unit 30 may not only generate image data but also perform a process adapted to the application. For example, a gesture detected by the gesture detection unit 28 may be mapped to a process corresponding to the gesture and the output data generation unit 30 may perform a process corresponding to the gesture.

FIG. 6 shows the configuration of the tracking processing unit in detail. The tracking processing unit 26 comprises an image processing unit 40 configured to generate an edge image from input image data, a sampling unit 42 configured to perform sampling in the parameter space by creating and eliminating particles, an observation unit 46 configured to observe the likelihood of a candidate curve defined by each particle, a result acquisition unit 50 configured to integrate the results of observation and estimate a shape-space vector, and a parameter storage unit configured to store a parameter defining a Greek ohm-shaped template.

The image processing unit 40 performs an edge extracting process on each image frame of the input image data to generate edge images. A typical edge extracting algorithm, such as the Canny edge filter or the Sobel filter, may be used in the edge extracting process. The image processing unit 40 may perform preprocess prior to the edge extracting process, in order to efficiently extract the edges of the target object. For example, the image processing unit 22 includes a foreground extractor (not shown) that uses background subtraction, thereby extracting foreground objects including the target object from the input image.

The sampling unit 42 creates and eliminates particles based on the probability density distribution in the space defined by shape-space vectors x, which is estimated for the image frame at the previous time t−1. The particles are then made to undergo a transition in the space by applying a given motion model to all the particles.

The observation unit 46 observes the likelihood of the candidate curve defined by each particle that is generated, eliminated, and transited by the sampling unit 42. The likelihood is determined by searching for edges in the neighborhood of the candidate curves in the edge image generated by the image processing unit 40 and estimating distances to the edges for the respective candidate curves. As described above, the candidate curve is obtained by applying the parameters defining each particle to a Greek ohm-shaped template read from the parameter storage unit 48.

The result acquisition unit 50 computes, in the space defined by shape-space vectors x, the probability density distribution given by expression 3 based on the observed likelihood from the observation unit 46, and computes the weighted average of the parameters accordingly. The data is returned to the sampling unit 42 in order to use it in a tracking process at time t+1.

If there are a plurality of target objects, the result acquisition unit 50 tracks the targets using templates specific to respective targets. The result acquisition unit 50 also detects an overlap of the target objects and eliminates one from behind another at a certain time in terms of the tracking process. Accordingly, even when a current target object hides behind another target object, and thus its observation likelihood temporarily goes down, it is possible to prevent the output of an incorrect tracking result.

FIG. 7 shows the configuration of the gesture detection unit 28 in detail. The gesture detection unit 28 comprises a tracking result acquisition unit 52 configured to acquire the curve defining the head contour at each point of time obtained as a result of visual tracking, a facial region analysis unit 54 configured to compute predetermined parameters indicating the orientation of the face by analyzing an image of the area inside a head contour, a history storage 56 configured to store the parameters and keep track of the history accordingly, a determination criterion storage 58 configured to store the criterion for determination that a gesture is made by referring to time-dependent change in the parameters, and a gesture determination unit 60 configured to determine whether a gesture is made by evaluating the time-dependent change in the parameters against the criterion.

Hereinafter, "parameters indicating the orientation of the face" will simply referred to as "face orientation angles" around the respective axes. For example, when a face recognition process is performed in the area inside a head contour, the angles of the face or a certain portion thereof around the Pitch axis or the Yaw axis can be acquired using an ordinary method. As mentioned before, the rotation angle θ (one of the parameters of the shape-space vector) can be used as the angle around the Roll axis. As mentioned before, the face orientation can be estimated without using a method for face recognition and can be estimated by, for example, referring to the area occupied by the face known by texture mapping. Depending on the method of identifying the face orientation, the "face orientation angle" can be translated into a different parameter as appropriate.

The tracking result acquisition unit 52 acquires the data for a curve representing the head contour estimated by the tracking processing unit 26 in each image frame. As mentioned before, the data results from weighted averaging of the parameters of the shape-space vector defining a particle, using the probability density distribution. The facial region analysis unit 54 applies a predefined process such as texture mapping or facial recognition in the area inside a head contour and acquires the face orientation angle in each image frame. The acquired results are sequentially stored in the history storage unit 56.

The gesture determination unit 60 determines, each time the facial region analysis unit 54 analyzes the face orientation angle, whether a gesture is made by checking time-dependent change in the face orientation angle occurring up to that point of time, which is obtained from the history of the face orientation angles stored in the history storage unit 56 and the new analysis result, against the criterion for determination defined in the determination criterion storage 58. The result of determination is communicated to the output data generation unit 30.

Figure 8:
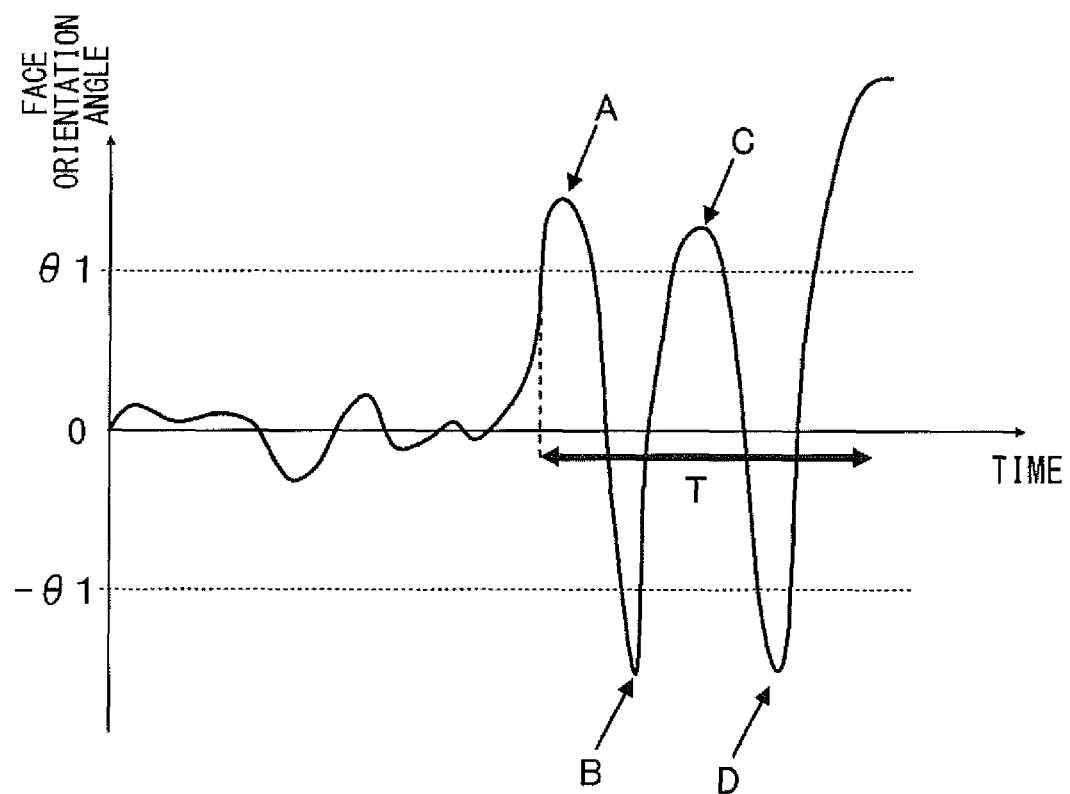
FIG. 8 shows an example of time-dependent change in the face orientation angle stored in the history storage according to the embodiment.

FIG. 8 shows an example of time-dependent change in the face orientation angle stored in the history storage 56. In the figure, the horizontal axis represents the time axis and face recognition angles are plotted on the vertical axis. The face orientation angle in a neutral position where no gestures are made is defined to be "0". The parameters of the face orientation angle at a neutral position are acquired in advance depending on the method of determining the face orientation angle.

For determination of the face orientation angle from the neutral position, the face orientation angle in each image frame may be directly determined by face recognition or matching. Alternatively, relative angular change may be determined by detecting the movement of texture from a preceding image frame. In this case, relative angular change may be corrected by acquiring the angle from the neutral position by comparing the current image with the image of the facial region occurring at the neutral position.

The history of face orientation angles is maintained equally in each of the rotation axes. The determination criterion storage 58 stores a determination criterion for determination that a gesture is made by referring to the variation in the face orientation angle as illustrated. For example, a threshold value for the amplitude of the face orientation angle, and a threshold value for the duration of oscillation may be set. In the example of FIG. 8, the former value is set at "±θ1", and the latter value is set at "T". In this case, a gesture is determined to be made when angle oscillation having an amplitude exceeding the threshold value "±θ1" is observed for a duration of "T" or longer.

The relation between the rotation axis and the gesture may be stored in the determination criterion storage 58. For example, oscillation around the Pitch axis is mapped to "affirmation", and oscillation around the Yaw axis is mapped to "negation". Angular oscillation can be detected by performing frequency analysis using fast Fourier transform (FFT) or the like. Alternatively, a threshold value may be established for the frequency of peaks so that a gesture is determined to be made when peaks exceeding "±θ1" occur a predetermined number of times within a predetermined duration "T". In the example of FIG. 8, small fluctuation is observed initially but the amplitude does not reach the threshold value "±θ1". A movement like this is not determined to be a gesture made by the user intentionally.

Later, four peaks "A", "B", "C", and "D" exceeding the threshold value "±θ1" are observed in succession within a duration of the threshold value T. In this case, a gesture is determined to be made when the duration of the threshold value T has elapsed since the first peak "A". Since angular oscillation is observed in this case, a gesture of "affirmation" (nodding) and a gesture of "negation" (shaking of head) can be detected. Meanwhile, the determination criterion may be defined variously depending on the process subsequently performed by the output data generation unit 30. If the detection of an action where the angle varies greatly once around one of the rotation axes and then returns to neutral (e.g., single action of nodding or tilting the head), only the threshold value of the angle may be defined.

FIG. 8 shows time-dependent change in the face orientation angle when the face orientation angle at the neutral position is defined to be "0". However, as mentioned above, the absolute value of the angle may not necessarily be acquired. For example, the amount of change per unit time and the direction thereof may be identified by referring to the amount of change from the image frame at the preceding point of time. In other words, a velocity vector may substantially be acquired. The time-dependent change thus identified enables the detection of the oscillation of orientation or position. The "amount of change" acquired in this case may not necessarily be the amount of change in the angle. The amount of movement of a portion of interest or change in the area occupied by an area of interest, obtained by computing a score of matching with the preceding image frame, may be defined as the amount of change. When a gesture is detected by referring to "time-dependent change in the velocity vector", a threshold value may be defined for the peak of the velocity and used as a criterion for determination.

Figure 9:
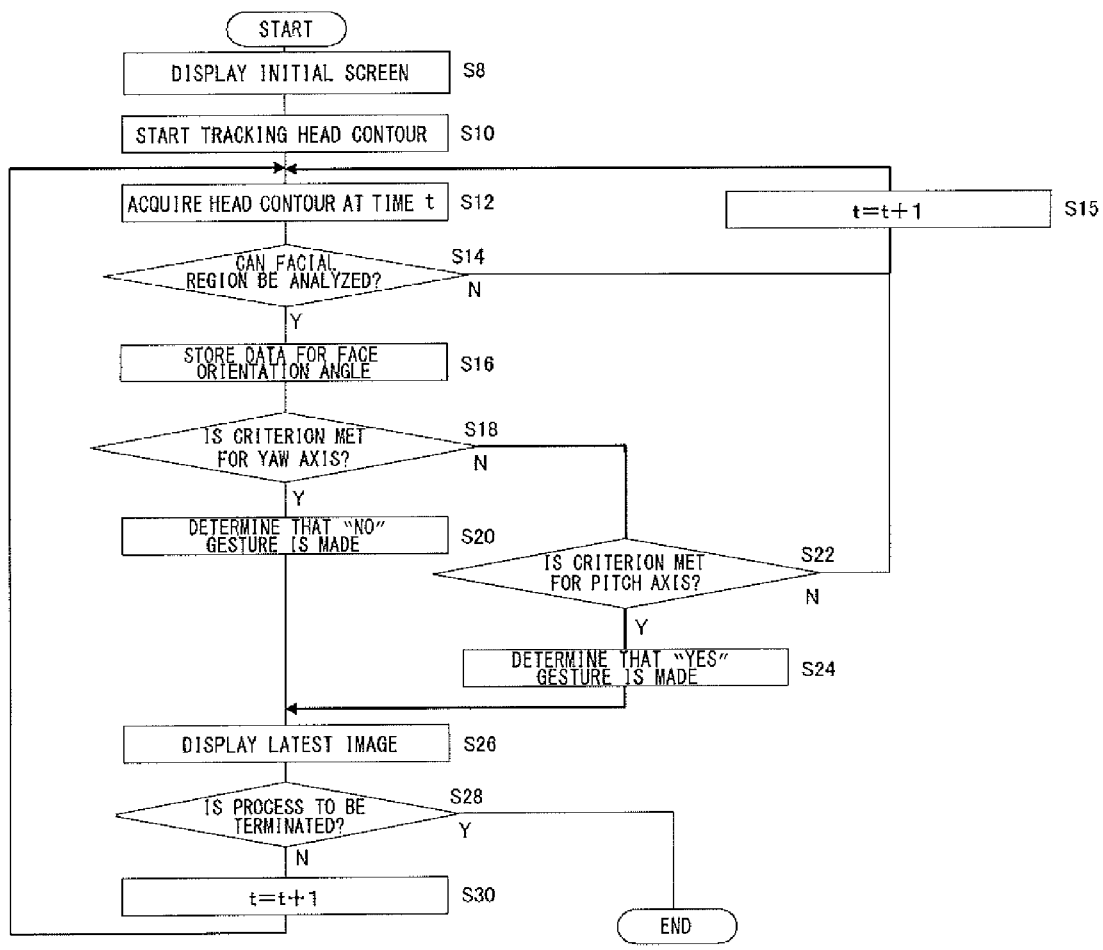
FIG. 9 is a flowchart showing the processing procedure performed by the information processing device according to the embodiment.

A description will now be given of the operation performed using the configuration described above. FIG. 9 is a flowchart showing the processing procedure performed by the information processing device 14. In the illustrate example, the user's swinging of the head around the Pitch axis (vertical direction) and the swinging around the Yaw axis (horizontal direction) are detected as gestures of "YES" (affirmation) and "NO" (negation), respectively, and are used in the game.

When the user starts game software, the image capturing device 12 starts imaging the user and displays an initial screen on the display 16 (S8). Meanwhile, the tracking processing unit 26 sequentially reads the image captured by the image capturing device 12 and starts visual tracking of the head contour (S10). As a result of tracking, the tracking result acquisition unit 52 of the gesture detection unit 28 acquires curve data for the head contour in the image frame at the current time t (S12). Subsequently, the facial region analysis unit 54 of the gesture detection unit 28 attempts to identify the facial region and the face orientation angle in the area inside the head contour thus acquired (S14). If for some reason that the facial region cannot be identified or the face orientation angle cannot be identified (N in S14), the facial region analysis unit 54 acquires the head contour of the image frame at the subsequent point of time t+1 (S15, S12).

If the facial region can be identified and the face orientation angle can be identified (Y in S14), the data for the face orientation angle is stored in the history storage 56 (S16). In this process, the angles around the rotation axes are stored in association with the ID of the image frame or the time t. Subsequently, the gesture determination unit 60 of the gesture detection unit 28 refers to the determination criterion stored in the determination criterion storage 58 so as to determine whether the determination criterion is met with regard to the Yaw axis (S18). If the criterion is met (Y in S18), it is determined that the user made a gesture of "NO" (S20).

If the criterion is not met with regard to the Yaw axis (N in S18), a determination is made whether the determination criterion is met with regard to the Pitch axis (S22). If the criterion is met (Y in S22), it is determined that the user made a gesture of "YES" (S24). It is generally known that a gesture of a person swinging the head is such that movement in the horizontal direction is more explicitly defined than the movement in the vertical direction. Therefore, by making a determination on oscillation around the Yaw axis first to exit from the branch Y of S18 as early as possible, the computational load required in making a determination with regard to the Pitch axis can be reduced. However, the embodiment is non-limiting as to the mode of determination. For example, determination with regard to two rotation axes may proceed in parallel.

If the determination criterion is not met in any of the rotation axes (N in S18, N in S22), the head contour in the image frame at the next point of time t+1 is acquired (S15, S12) so that a similar process is repeated (S14-S24). When a plurality of persons are imaged, the steps S14-S24 are repeated for the head contour of the respective persons. If it is determined that one of the types of gesture is made (S20 or S24), the output data generation unit 30 performs a process corresponding to the gesture. The image data generated as a result is displayed on the display 16 under control of the output control unit 32 (S26).

The flowchart of FIG. 9 focuses on the detection of a gesture made by the user and the other steps are omitted from the illustration. The latest image displayed in S26 may look animated even without a gesture. For example, an object in the image may be moved. When it is not necessary to terminate the process for the reason that the game is over or that the user provides a command to end the game (N in S28), the steps from S12 to S26 are repeated, using time t+1 of the next image frame as the current time t (S30). When it is necessary to terminate the process (Y in S28), the process is terminated.

In gesture determination in S18 and S22 in the flowchart of FIG. 9, a gesture is determined to be made when the oscillation of the face orientation angle lasts for a duration of the threshold value T, as described above. In practice, the system may not need to stand by until the threshold value T has elapsed because the probability that the oscillation represents a gesture will be increased with the growth of the duration. The property may be exploited such that a prediction of a gesture of "NO" or "YES" may be made at a certain point of time prior to completion of the duration defined by the threshold value T. For example, a prediction may be made when 70% of the duration defined by the threshold value T has elapsed. The process that should be performed following the ultimate determination of a gesture (e.g., generation of updating image data) may be speculatively performed in part at this stage.

In this case, if the oscillation lasts until the duration defined by the threshold value T has elapsed, subsequent processing is initiated using the result of the process speculatively performed. If the oscillation is gone before the duration defined by the threshold value T has elapsed, the result of the speculative process is discarded. In this way, responsiveness of the post-gesture process or the post-gesture output is improved.

Figure 10:
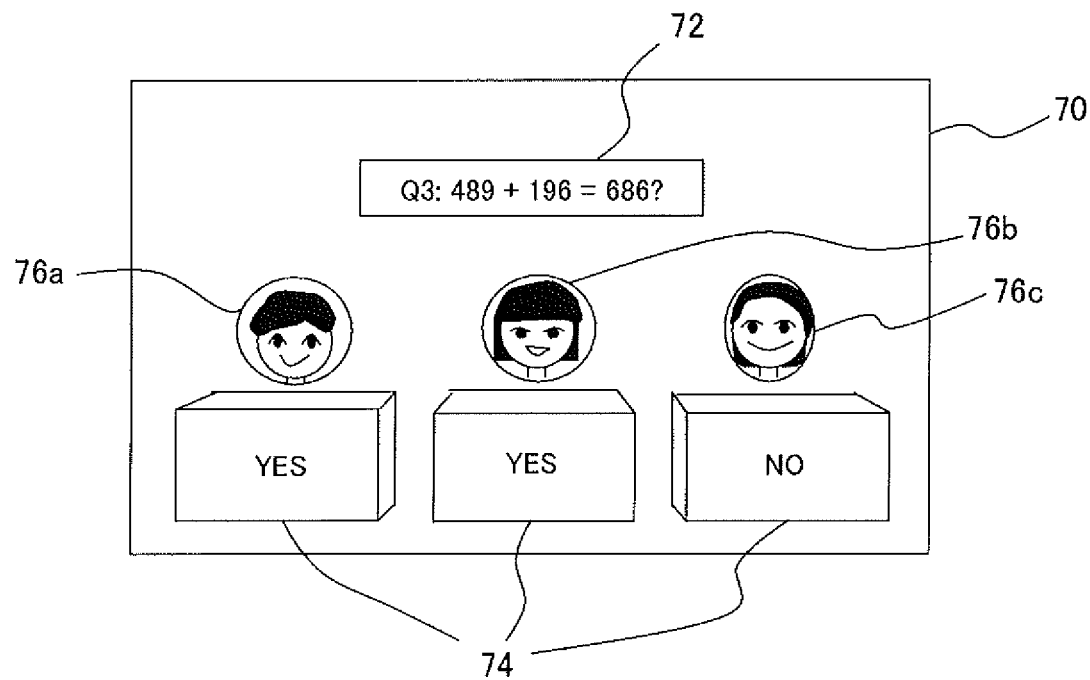
FIG. 10 shows an exemplary image displayed on a display device in a game subject to the process of the flowchart of FIG. 9.

A description will now be given of an example of application implemented by the embodiment. FIG. 10 shows an exemplary image displayed on the display 16 in a game subject to the process shown in the flowchart of FIG. 9. The game is designed such that a plurality of participants responds to questions displayed on the display 16 with "YES" or "NO". A rule may be established such that the head is swung vertically several times if the answer is "YES", and the head is swung horizontally if the answer is "NO". During the game, the display 16 displays a game screen 70.

The game screen 70 is designed to simulate a TV panel show and shows as many panelists' sheets 74 as the number of participants. The participants' head contour portions obtained as a result of visual tracking are extracted from the image captured by the image capturing device 12 and including the participants. The extracted portions are displayed as face images 76a, 76b, and 76c of the participants above the panelists' sheets 74. The participant viewing a question displayed in a question area 72 responds by swinging the head in accordance with the above-described rule. The gesture detection unit 28 determines whether the participant made a gesture of "YES" or a gesture of "NO" and notifies the output data generation unit 30 accordingly.

Since visual tracking and gesture detection are actually performed in an image captured by the image capturing device 12, correspondence between the image of the head region and the content of the gesture is established. Therefore, the output data generation unit 30 can display a character string "YES" or "NO", indicating the content of the gesture, in association with the participants' sheets 74 to indicate the answer of the respective participants. Further, the output data generation unit 30 may indicate whether each answer is correct or not. Scores may be displayed behind the participants' sheets. By displaying a screen such as this, the user can enjoy the game, feeling as if the user is a panelist in the panel show. Since an answer is given by a gesture of the head, there is no need to make controllers available for the participants so that a large number of persons can participate in the game.

By using the meaning intrinsic to a gesture of swinging the head, an input can be provided to the device through physical movement more natural for the user to make than otherwise. Accordingly, the user can enjoy games etc. in a more relaxed condition. The embodiment can be applied to various games other than panel shows. For example, an avatar representing the user in a virtual world displayed on the display 16 may be controlled to express the user's intention and communicate with other users.

The swinging of the head in at least two directions can be detected so that the inventive interface can replace a mouse by translating the swinging motion in one direction into a left click of a mouse and motion in the other direction into a right click of a mouse. This will also allows the user to provide an input through an intuitive action and eliminates the need for a space required to use a mouse. Therefore, various information processing can be triggered using a limited space.

According to the embodiment described above, the time evolution of the head region of the user is tracked using a visual tracking technology. A determination is made as to whether a gesture is made by monitoring the orientation of the facial region of the head region. This allows tracking of a human action (continuous time-dependent change with time), finding relevance to a preceding image frame. As a result, the face can be detected without fail and the face orientation angle can be acquired accordingly, even when a face recognition process, characterized by difficulty to maintain precision of detection in the event that the user is not facing front, is used. Thus, gestures can be detected with precision. Further, gestures can also be detected easily by applying a process, such as texture mapping, capable of acquiring a parameter indicating the orientation of the face without using face recognition. The method of identifying the face orientation may appropriately selected depending on the brightness of an image or the number of persons imaged.

By keeping track of the area inside the head contour globally in a matching process, variation of the angle of the head portion with respect to the image capturing device can be kept track of in an isolated manner regardless of the orientation of the face, by referring to variation in an area occupied by the head region. With the use of this approach, variation in detection is amplified. For example, a gesture of a user facing sideways with respect to the image capturing device and tilting the head may be recognized as a nod. Thus, the mode of detection called for in different applications can be achieved easily.

A gesture is detected by identifying the head region, allowing for relevance to a preceding image. Therefore, large deformation of the head region resulting from the movement or bending of a user is canceled in the process of tracking the head contour, allowing continuous acquisition of the face orientation angle. Another advantage is that movements other than a gesture are prevented from affecting the value of the face orientation angle severely. The head contour does not undergo a large change even if the user holds the hand against the face or wears a mask. Therefore, a tracking process and, ultimately, a process of detecting a gesture is not affected severely with the result that precision in detecting a gesture is maintained.

Further, the head contour of each of a plurality of persons captured at the same time can be tracked continuously so that correspondence between the person and the gesture can be established in a natural manner. Even when persons move close to each other or cross each other, a gesture is detected with reference to each head contour tracked. Therefore, it is highly unlikely that a person's face is mistaken for the face of another during a gesture and results in failure in detecting a gesture. Consequently, the inventive detection can be easily applied to games that allow participation of a plurality of persons and promises development of a variety of applications.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In this embodiment, detection of a gesture by referring to time-dependent change in the face orientation angle is described by way of example. A gesture can alternatively be detected through a similar process by referring to time-dependent change in the face position. In this case, the position of the face in the two-dimensional plane facing the image capturing device can be identified by referring to the translation amount parameter of the shape-space vector defining the head contour and obtained as a result of visual tracking, or by image analysis such as face recognition performed in the area inside the head region. Further, the position in the depth direction with respect to the image capturing device can be identified by referring to the magnification parameter of the shape-space vector defining the head contour or the size of the facial region.

A gesture is detected by defining a criterion for time-dependent change in the face position for the purpose of detecting a gesture. For example, movement of the face away from the image capturing device may be mapped to a gesture of surprise, and leaning-out of the body and approach of the face toward the image capturing device may be mapped to a gesture of interest. Further, gestures like recession of the head or stretching of the head may be detected by focusing on the Greek ohm-shape representing the head contour itself in visual tracking. By using such positional variation in a pointing operation of a mouse, left and right clicks and pointing can all be indicated using a facial motion.

In accordance with the embodiment, the head region is subject to visual tracking before detecting a gesture of swinging the head by identifying time-dependent change in the face orientation. Alternatively, state change in the eye or mouth may be acquired instead of the face orientation. In this case, the area inside the head contour identified by visual tracking is subject to a face recognition process so as to acquire the state of a target portion (e.g., how much the eyelid is open or how much the mouth is open). By maintaining a history of time-dependent change, blinking or speech is detected. This will also allow highly precise detection because, as in the embodiment, the state of the portion is identified by closely monitoring time-dependent change in the head region and, ultimately, the facial region.

DESCRIPTION OF THE REFERENCE
NUMERALS 10 information processing system, 12 image capturing device, 14 information processing device, 16 display, 20 image acquisition unit, 26 tracking processing unit, 28 gesture detection unit, 30 output data generation unit, 32 output control unit, 40 image processing unit, 42 sampling unit, 46 observation unit, 50 result acquisition unit, 52 tracking result acquisition unit, 54 facial region analysis unit, 56 history storage unit, 58 determination criterion storage, 60 gesture determination unit

INDUSTRIAL APPLICABILITY

As described, the present invention can be applied to information processing devices such as computers, game devices, and image processing device.

The invention claimed is:

1. An information processing device comprising:
   an image capturing device configured to capture a movement of an object within a moving image;
   a tracking processing unit configured to define a candidate curve representing a contour of an object in a current image frame included in the moving image captured by the image capturing device, based on a contour of the object estimated in an image frame at a preceding point of time, and to estimate the contour of the object in the current image frame by observing the likelihood of the candidate curve;
   a gesture detection unit configured to acquire a parameter indicating an orientation of the object or a position of the object by performing image analysis in an area inside the contour of the object estimated by the tracking processing unit, and determine whether a gesture is made by checking a time-dependent change in the orientation of the object or in the position of the object, which is estimated from the parameter, by referring to a criterion defined for each gesture; and
   an output data generation unit configured to perform, when the gesture detection unit determines that a gesture is made, a process corresponding to the gesture and generate output data accordingly.

2. The information processing device according to claim 1, wherein the time-dependent change in the orientation of the object estimated by the gesture detection unit is a variation in an angle of the orientation of the object around three rotational axes.

3. The information processing device according to claim 2, wherein the tracking processing unit estimates a head contour of a user,
   the gesture detection unit refers to the estimated time-dependent change in an orientation of the head, and determines that a nodding gesture is made when a vertical oscillation of an angle of the orientation of the head lasts for a predetermined period of time, with an amplitude exceeding a predetermined threshold value.

4. The information processing device according to claim 2, wherein the tracking processing unit estimates a head contour of a user, and
   the gesture detection unit refers to the estimated time-dependent change in an orientation of the head, and determines that a gesture of shaking the head sideways is made when a horizontal oscillation of an angle of the orientation of the head lasts for a predetermined period of time, with an amplitude exceeding a predetermined threshold value.

5. The information processing device according to claim 2, wherein the tracking processing unit estimates a head contour of a user, and
   the gesture estimation unit refers to the estimated time-dependent change in an orientation of the head, and determines that a gesture is made when a velocity vector, which indicates an amount of variation in the orientation of the head per a unit time and a direction of the variation, meets a predetermined criterion.

6. The information processing device according to claim 2, wherein the tracking processing unit estimates a head contour of a user, and
   wherein the gesture estimation unit refers to the estimated time-dependent change in an orientation of the head, and determines whether a gesture of shaking the head sideways is made by verifying whether a horizontal oscillation of an angle of the orientation of the head meets a predetermined criterion, and verifies, when it is determined that a gesture of shaking the head sideways is not made, whether a nodding gesture is made by verifying whether a vertical oscillation of an angle of the orientation of the head meets a predetermined criterion.

7. The information processing device according to claim 1, wherein the gesture detection unit acquires variation in the orientation of the object or in the position of the object, by computing a matching score between an image of an area inside the contour of the object estimated in an image frame and an image of the inside area of the object estimated in a preceding image frame.

8. The information processing device according to claim 7, wherein the gesture detection unit acquires an amount of movement of a portion of interest in the inside area between image frames by computing a matching score, and acquires the orientation of the object accordingly.

9. The information processing device according to claim 1, wherein the tracking processing unit estimates a head contour of a user,
   the gesture detection unit identifies a facial region by performing texture mapping in an area inside the head contour and estimates a time-dependent change in an orientation of the head based on the variation in an area occupied by the facial region and a direction of the variation.

10. The information processing device according to claim 1,
    wherein the image capturing device captures an image of a plurality of users,
    the tracking processing unit estimates a head contour in each image frame on a user-by-user basis, and
    the gesture detection unit determines whether a gesture is made, for each estimated head contour.

11. The information processing device according to claim 10,
    wherein the output data generation unit generates image data including images of the area inside the head contours of a plurality of users estimated by the tracking processing unit, and images dependent on a result of determination as to whether a gesture is made by referring to each head contour, the image being displayed in association with the respective users.

12. An information processing method comprising:
    capturing a movement of an object within a moving image;
    defining a candidate curve representing a contour of an object in a current image frame included within the moving image as captured, based on a contour of the object estimated in an image frame at a preceding point of time, and estimating the contour of the object in the current image frame by observing the likelihood of the candidate curve;

acquiring a parameter indicating an orientation of the object or a position of the object by performing image analysis in an area inside the contour of the object as estimated;

determining whether a gesture is made by checking a time-dependent change in the orientation of the object or in the position of the object, which is estimated from the parameter, by referring to a criterion defined for each gesture; and performing, when it is determined that a gesture is made, a process corresponding to the gesture and generating output data accordingly.

13. A computer program embedded in a non-transitory computer-readable recording medium, comprising:

a module configured to capture a movement of an object within a moving image;

a module configured to define a candidate curve representing a contour of an object in a current image frame included within the moving image as captured, based on a contour of the object estimated in an image frame at a preceding point of time, and estimate the contour of the object in the current image frame by observing the likelihood of the candidate curve;

a module configured to acquire a parameter indicating an orientation of the object or a position of the object by performing image analysis in an area inside the contour of the object as estimated;

a module configured to determine whether a gesture is made by checking a time-dependent change in the orientation of the object or in the position of the object, which is estimated from the parameter, by referring to a criterion defined for each gesture; and a module configured to perform, when it is determined that a gesture is made, a process corresponding to the gesture and generating output data accordingly.

14. A non-transitory computer-readable recording medium having embodied thereon a computer program comprising:

a module configured to capture a movement of an object within a moving image;

a module configured to define a candidate curve representing a contour of an object in a current image frame included within the moving image as captured, based on a contour of the object estimated in an image frame at a preceding point of time, and estimate the contour of the object in the current image frame by observing the likelihood of the candidate curve;

a module configured to acquire a parameter indicating an orientation of the object or a position of the object by performing image analysis in an area inside the contour of the object as estimated;

a module configured to determine whether a gesture is made by checking a time-dependent change in the orientation of the object or in the position of the object, which is estimated from the parameter, by referring to a criterion defined for each gesture; and a module configured to perform, when it is determined that a gesture is made, a process corresponding to the gesture and generating output data accordingly.

* * * * *